United States Patent
Imura

(10) Patent No.: US 8,064,133 B2
(45) Date of Patent: Nov. 22, 2011

(54) LIGHT RECEIVING OPTICAL SYSTEM, AND SPECTROPHOTOMETER INCORPORATED WITH THE SAME

(75) Inventor: Kenji Imura, Toyohashi (JP)

(73) Assignee: Konica Minolta Sensing, Inc., Osaka (JP)

(*) Notice: Subject to any disclaimer, the term of this patent is extended or adjusted under 35 U.S.C. 154(b) by 528 days.

(21) Appl. No.: 12/217,851

(22) Filed: Jul. 9, 2008

(65) Prior Publication Data

US 2009/0015916 A1     Jan. 15, 2009

(30) Foreign Application Priority Data

Jul. 12, 2007     (JP) ................................. 2007-183555

(51) Int. Cl.
    *G02B 23/14*     (2006.01)
(52) U.S. Cl. ................. 359/432; 356/233; 250/339.07
(58) Field of Classification Search .................. None
    See application file for complete search history.

(56) References Cited

U.S. PATENT DOCUMENTS

| | | | |
|---|---|---|---|
| 3,813,172 A * | 5/1974 | Walker et al. ................ | 356/225 |
| 5,748,385 A | 5/1998 | Miyano | |

FOREIGN PATENT DOCUMENTS

| | | |
|---|---|---|
| JP | 62-235519 A | 10/1987 |
| JP | 3-100512 A | 4/1991 |
| JP | 8-54561 A | 2/1996 |
| JP | 8-304931 A | 11/1996 |
| JP | 2000-44166 A | 2/2000 |
| JP | 2001-264166 | 9/2001 |
| JP | 2001-264166 A | 9/2001 |

OTHER PUBLICATIONS

Figs. 7 and 8 of present application filed Jul. 9, 2008 entitled "Light Receiving Optical System, and Spectrophotometer Incorporated With the Same."
Office Action Dated Jun. 14, 2011 for Japanese Application No. 2007-183555.

* cited by examiner

*Primary Examiner* — Derek S Chapel
(74) *Attorney, Agent, or Firm* — Brinks Hofer Gilson & Lione

(57) ABSTRACT

A light receiving optical system includes: a relay optical system for converging light to be measured which has been converged on an image plane of an objective optical system. The light receiving optical system has a relay optical system with a relay lens operable to be selectively switched between first and a second conjugate positions, and a first and a second light flux limiting aperture members selectively switched between the first and the second conjugate positions. The relay optical system selectively forms, on the image plane of the objective optical system, an enlarged image and a reduced image of a view angle defining aperture in the case where the relay lens is selectively switched between the first and the second conjugate positions to define an incident light flux through the view angle defining aperture by a first and a second light flux limiting apertures, respectively.

6 Claims, 6 Drawing Sheets

LIGHT RECEIVING OPTICAL SYSTEM, AND SPECTROPHOTOMETER INCORPORATED WITH THE SAME

This application is based on Japanese Patent Application No. 2007-183555 filed on Jul. 12, 2007, the contents of which are hereby incorporated by reference.

BACKGROUND OF THE INVENTION

1. Field of the Invention

The present invention relates to a light receiving optical system to be incorporated in a spectral device such as a spectrophotometer, and more particularly to a light receiving optical system operable to switch a view angle, and a spectrophotometer incorporated with the light receiving optical system.

2. Description of the Related Art

FIG. 7 is a diagram showing an example of a conventional light receiving optical system to be incorporated in a spectral device such as a spectrophotometer. The light receiving optical system 900 shown in FIG. 7 has an aperture plate (hereinafter, called as a "view angle switching aperture plate") 902 for view angle switching control. The view angle switching aperture plate 902 is formed with an aperture 902a having a radius Ra for providing a view angle of 1°, and an aperture 902b having a radius Rb for providing a view angle of 0.1° with respect to an image plane of the objective lens 901. Immediately after a light flux 903a incident onto the objective lens 901 is converged i.e. condensed while passing through the aperature 902a or 902b, the light flux 903a is incident onto a conversion fiber 904 through an incident end 904a.

The view angle θ is given by: 2*a tan(Ra/F1) or 2*a tan(Rb/F1), where F1 is a distance between the objective lens 901 and the view angle switching aperture plate 902, Ra is a radius of the aperture 902a, Rb is a radius of the aperture 902b, and the symbol "*" indicates multiplication. The conversion fiber 904 has the incident end 904a of a circular shape in cross section at one end thereof, and a slit-shaped exit end 904b at the other end thereof, (see FIG. 4 to be described later). The exit end 904b serves as an incident slit of a polychromator 905. In this arrangement, a light flux incident through the circular incident end 904a is allowed to be efficiently incident onto a diffraction optical system (not shown) in the polychromator 905 with a predetermined slit width.

The view angle θ is switched by moving e.g. sliding the view angle switching aperture plate 902 to such a position that one of the apertures 902a and 902b is aligned in front of the incident end 904a. The incident site i.e. the incident position of incident light (i.e. the light flux 903a converged by the objective lens 901) onto the incident end 904a may be displaced due to a reproduction error with respect to the aperture position in the switching operation. This may displace the exit position of exit light 903c through the exit end 904b, thereby impairing measurement reproducibility.

On the other hand, an aperture 906a of an aperture stop 906 disposed near the objective lens 901 is adapted to regulate the incident light flux i.e. the incident light amount with respect to the aperture 902a or the aperture 902b of the view angle switching aperture plate 902 to define a possible incident angle of incident light. The possible incident angle is substantially maintained after propagation of the light flux through the conversion fiber 904, and is substantially equal to an exit angle i.e. a divergent angle ω of the exit light 903c. Preferably, the exit angle ω is substantially coincident with a possible incident angle with respect to a concave diffraction grating (not shown) in order to sufficiently utilize the performance of the concave diffraction grating in the diffraction optical system of the polychromator 905. The aperture diameter of the aperture stop 906 is defined to realize the above arrangement. The effective brightness of the whole optical system is substantially determined based on the effective area of the exit aperture i.e. the exit end 904b, in other words, based on the radius Ra of the aperture 902a, the radius Rb of the aperture 902b, and the exit angle ω. In the case where the aperture 902b for providing the view angle of 0.1° is aligned in front of the incident end 904a of the polychromator 905, the amount of light to be incident onto the polychromator 905 is merely one-hundredth of the amount of light to be incident onto the polychromator 905 in the case where the aperture 902a for providing the view angle of 1° is aligned in front of the incident end 904a of the polychromator 905, unconditionally i.e. irrespective of the performance of the objective lens 901.

In a light receiving optical system 920 disclosed in e.g. Japanese Unexamined Patent Publication No. 2001-264166 (D1), as shown in FIG. 8, a relay lens 923 is arranged between a view angle switching aperture plate 921 and an incident end 922a of a conversion fiber 922. The relay lens 923 is arranged at such a position that a focal point thereof is aligned with the center of an aperture 921a or an aperture 921b of the view angle switching aperture plate 921 to form an image 922c through the incident end 922a of the conversion fiber 922 immediately behind an objective lens 924. The image 922c serves as an aperture stop image for regulating a light flux to be incident onto a polychromator 925. Similarly to the arrangement example shown in FIG. 7, the conversion fiber 922 has a slit-shaped exit end 922b serving as an incident slit of the polychromator 925. Also, similarly to the arrangement example shown in FIG. 7, switching of the view angle .theta. is performed by moving the aperture plate 921 to such a position that one of the aperture 921a and the aperture 921b is aligned in front of the incident end 922a. In the example shown in FIG. 8, however, there is no likelihood that the incident site of a light flux 926a onto the incident end 922a may be displaced resulting from a position error of the aperture 921a or the aperture 921b to be used in the switching operation, because the light flux 926a passing through the aperture 921a or the aperture 921b is incident onto the entirety of the incident end 922a, irrespective of the aperture position of the aperture 921a and the aperture 921b.

However, since the angle distribution of incident light i.e. the light flux 926a with respect to the incident end 922a is changed resulting from the position error, transmission efficiency of the conversion fiber 922 is changed accordingly. Also, the angle distribution of exit light 926c is changed resulting from a change in angle distribution of the incident light. As a result, the diffraction efficiency i.e. the reflection efficiency of the concave diffraction grating is changed, which may impair measurement reproducibility. Assuming that the aperture 921a is operable to provide a view angle of 1.degree., and the aperture 921b is operable to provide a view angle of 0.1°, similarly to the arrangement example shown in FIG. 7, the amount of incident light to be incident onto the polychromator 925 in the case where the aperture 921b is aligned in front of the incident end 922b of the polychromator 925 is unconditionally one-hundredth of the amount of light to be incident onto the polychromator 925 in the case where the aperture 921a is aligned in front of the incident end 922b of the polychromator 925.

SUMMARY OF THE INVENTION

In view of the above conventional examples, it is an object of the present invention to provide a light receiving optical system that enables to increase an incident light amount at a small view angle, in other words, control the incident light amount depending on a switching operation of the view angle, with no or less influence of reproduction error resulting from movement of an optical system for view angle switching control, and a spectrophotometer incorporated with the light receiving optical system.

A light receiving optical system according to an aspect of the invention comprises: a relay optical system for converging light to be measured which has been converged on an image plane of an objective optical system on a view angle defining aperture for incidence through the view angle defining aperture. The light receiving optical system has the relay optical system with a relay lens operable to be selectively switched between a first conjugated position and a second conjugated position, and a first light flux limiting aperture member and a second light flux limiting aperture member disposed in proximity to the relay lens in the case where the relay lens is selectively switched between the first conjugated position and the second conjugated position. The relay optical system is operable to selectively form, on the image plane of the objective optical system, an enlarged image and a reduced image with respect to the view angle defining aperture in the case where the relay lens is selectively switched between the first conjugated position and the second conjugated position to define an incident light flux through the view angle defining aperture by a first light flux limiting aperture and a second light flux limiting aperture, respectively, in the case where the relay lens is selectively switched between the first conjugated position and the second conjugated position.

A spectrophotometer according to another aspect of the invention comprises the light receiving optical system having the above arrangement.

The inventive light receiving optical system and the inventive spectrophotometer are advantageous in increasing the incident light amount at a small view angle, in other words, control the incident light amount depending on a switching operation of the view angle, with no or less influence of reproduction error resulting from movement of an optical system for view angle switching control.

These and other objects, features and advantages of the present invention will become more apparent upon reading the following detailed description along with the accompanying drawings.

DETAILED DESCRIPTION OF THE PREFERRED EMBODIMENTS OF THE INVENTION

Figure 1:
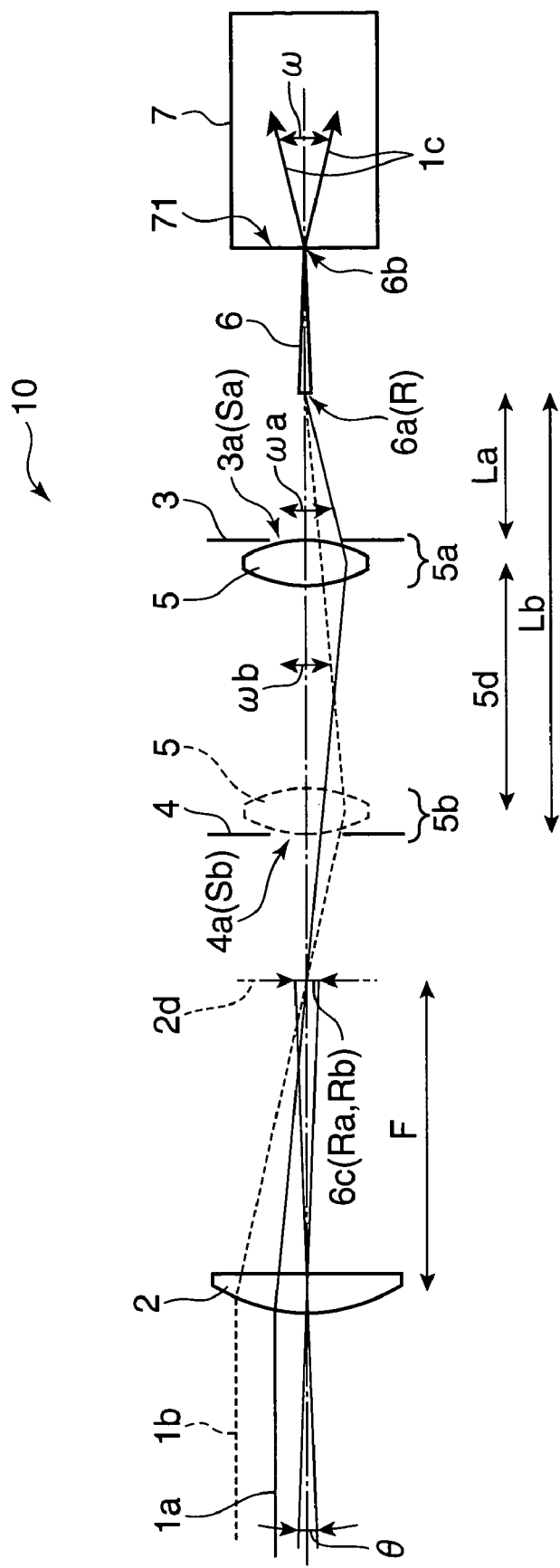
FIG. 1 is a diagram showing an example of a light receiving optical system embodying the invention.

FIG. 1 is a diagram showing an example of a light receiving optical system embodying the invention. The light receiving optical system 10 shown in FIG. 1 is a light receiving optical system to be incorporated in a spectrophotometer for measuring a spectral distribution of light to be irradiated from e.g. a specific measurement area. The light receiving optical system 10 includes an objective lens 2, a first aperture stop 3, a second aperture stop 4, a relay lens 5, a conversion fiber 6, and a polychromator 7. The objective lens 2 is adapted to form an image on a focal plane by condensing a light flux from a measurement object. The objective lens 2 is an example of an objective optical system. The objective optical system may be constituted of a single lens element as described above, or plural lens elements. The first aperture stop 3 and the second aperture stop 4 respectively include an aperture 3a and an aperture 4a each having a predetermined diameter to regulate i.e. define a light flux, specifically the numerical aperture (NA) of the light flux, to be incident onto an incident end 6a to be described later. Specifically, the incident light flux i.e. the light amount or the brightness of incident light onto the incident end 6a is regulated by the area of each of the apertures.

The relay lens 5 is a lens for transmitting an enlarged image or a reduced image from a certain position to another position in the optical system. In this embodiment, the relay lens 5 is a biconvex lens element with both lens surfaces thereof being formed into a convex shape, specifically, a symmetrical biconvex lens element with both lens surfaces thereof symmetrical to each other. The relay lens 5 has such a construction that the relay lens 5 is selectively locatable at conjugated positions to be described later. The relay lens 5 is an example of a relay optical system. The relay optical system may be constituted of a single lens element as described above, or plural lens elements.

Figure 4:
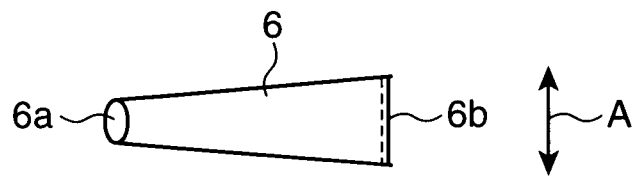
FIG. 4 is a perspective view showing an example of a conversion fiber shown in FIGS. 1 through 3.

The conversion fiber 6 as an optical fiber is adapted to allow a light flux incident through the conversion fiber 6 to be efficiently incident onto a diffraction optical system (not shown) in the polychromator 7 with a predetermined slit width. The conversion fiber 6 is a so-called fiber bundle formed by bundling multiple optical fibers. As shown in FIG. 4, for instance, the conversion fiber 6 has the incident end 6a of a circular shape in cross section at one end thereof, and a linear exit end 6b at the other end thereof. The incident end 6a, as an incident end surface, of the conversion fiber 6 is an aperture for defining i.e. determining the view angle θ i.e. an incident end image 6c, as will be described later, and is also called as a view angle defining aperture.

Figure 5:
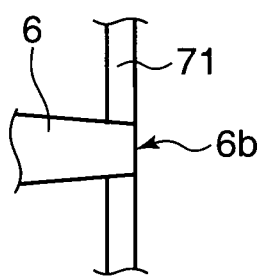
FIG. 5 is an enlarged view showing an exit end of the conversion fiber i.e. an incident slit of a polychromator.

As shown in FIG. 5, the exit end 6b is engaged in a slit groove of a slit plate 71 constituting e.g. a side wall corresponding to an incident wall of the polychromator 7, and serves as an incident slit extending in a direction of arrows A in FIG. 4, perpendicular to the plane of FIG. 1. In the case where a light flux to be incident onto the conversion fiber 6 includes a polarization component, the conversion fiber 6 is operable to make a polarization direction of the polarization component substantially uniform by a mixing operation, as the light propagates through the optical fiber. The conversion fiber 6 may be a single fiber, in place of the fiber bundle.

The polychromator 7 is adapted to output a signal i.e. a spectral output of each wavelength in e.g. a visible range from 380 nm to 780 nm, depending on a spectral distribution of exit light 1c to be outputted from the exit end 6b through the conversion fiber 6 i.e. incident light through the incident slit. The polychromator 7 is built-in with a concave diffraction grating (not shown) and a sensor array (not shown) i.e. a light detector array. The polychromator 7 is constructed in such a manner that the exit light is reflected or diffracted by the concave diffraction grating for detection on the sensor array as a dispersed image, and a pixel signal is outputted in accordance with a spectral light intensity. As far as the above operation is performed, any spectral device may be used, in place of the polychromator 7.

In the above arrangement, an incident light flux $1a$ (or $1b$) is converged on an image plane $2d$ of the objective lens 2 by a lens action of the objective lens 2, and then is converged on the incident end $6a$ of the conversion fiber 6 by the relay lens 5. The incident light flux $1a$ (or $1b$) that has been converged on the incident end $6a$ is incident onto the polychromator 7 through the exit end $6b$ of the conversion fiber 6, whereby a spectral intensity distribution of the incident light is measured. The relay lens 5 has a first conjugated position $5a$ and a second conjugated position $5b$, and is selectively switched between the first conjugated position $5a$ and the second conjugated position $5b$ by a manual operation or a predetermined driver (not shown). In FIG. 1, the first conjugated position $5a$ and the second conjugated position $5b$ are away from each other by a distance $5d$.

In the case where the relay lens 5 is shifted to the first conjugated position $5a$, an incident end image $6c$ having a size 3.2 times as large as the image i.e. a circular incident end image at the end surface of the incident end $6a$ is formed on the image plane $2d$. In the case where the relay lens 5 is shifted to the second conjugated position $5b$, an incident end image $6c$ having a size 1/3.2 times as large as the image on the end surface of the incident end $6a$ is formed on the image plane $2d$. Assuming that the radius of the incident end $6a$ is R, the radius Ra of the incident end image $6c$ in the case where the relay lens 5 is shifted to the first conjugated position $5a$, and the radius Rb of the incident end image $6c$ in the case where the relay lens 5 is shifted to the second conjugated position $5b$ are respectively Ra=3.2R, and Rb=R/3.2. Assuming that the focal length of the objective lens 2 is F, the ratio of the view angle $\theta$ (also, called as a "divergent angle") to be given by $2*a \tan(Ra/F)$, and the view angle $\theta$ to be given by $2*a \tan(Rb/F)$ is ten. For instance, the view angle $\theta$ are respectively set to 1° and 0.1° in the case where the relay lens 5 is shifted to the first conjugated position $5a$ and the second conjugated position $5b$. As described above, selectively locating the relay lens 5 i.e. switching the position of the relay lens 5 between the first conjugated position $5a$ and the second conjugated position $5b$ enables to selectively form, on the image plane $2d$ including a proximal position of the image plane $2d$, an enlarged image, as the incident end image $6c$, to be incident onto the incident end $6a$ as the view angle defining aperture, in the case where the relay lens 5 is shifted to the first conjugated position $5a$; and a reduced image, as the incident end image $6c$, to be incident onto the incident end $6a$, in the case where the relay lens 5 is shifted to the second conjugated position $5b$. In other words, the above arrangement enables to perform a switching operation of the view angle $\theta$.

The first aperture stop 3 and the second aperture stop 4 are fixed at such positions that the aperture $3a$ of the first aperture stop 3 and the aperture $4a$ of the second aperture stop 4 are respectively arranged at positions in proximity to the relay lens 5, in other words, positions free of interruption of movement of the relay lens 5, in the case where the relay lens 5 is selectively switched between the first conjugated position $5a$ and the second conjugated position $5b$. In this arrangement, the incident light flux with respect to the incident end $6a$, in the case where the relay lens 5 is selectively switched between the first conjugated position $5a$ and the second conjugated position $5b$, is regulated by the aperture $3a$ of the first aperture stop 3 and the aperture $4a$ of the second aperture stop 4, respectively. The aperture $3a$ and the aperture $4a$ may also be called as light flux limiting apertures.

Assuming that areas i.e. aperture areas of the aperture $3a$ and the aperture $4a$ are respectively Sa and Sb, the distance between the first aperture stop 3 and the incident end $6a$ is La, and the distance between the second aperture stop 4 and the incident end $6a$ is Lb, the incident light amounts with respect to the incident end $6a$ to be obtained in the case where the relay lens 5 is selectively switched between the first conjugated position $5a$ and the second conjugated position $5b$, are respectively proportional to $Sa/La^2$ and $Sb/Lb^2$. Specifically, the ratio of incident light flux amount with respect to the incident end $6a$ in the case where the view angle $\theta$ is selectively switched between the first conjugated position $5a$ and the second conjugated position $5b$ is given by: $Sa/La^2:Sb/Lb^2$. In this arrangement, an influence of position error of the relay lens 5 resulting from a switching operation of the view angle $\theta$ to the incident light amount is negligibly small in the case where the relay lens 5 is shifted to the first conjugated position $5a$. Also, in the case where the relay lens 5 is shifted to the second conjugated position $5b$, the influence is negligibly small, because the relay lens 5 and the aperture $4a$ of the second aperture stop 4 are arranged in proximity to each other, and the distance Lb is large.

In the above arrangement, a possible incident angle $\omega a$ and a possible incident angle $\omega b$ with respect to the incident end $6a$ are individually settable by the aperture $3a$ and the aperture $4a$. For instance, assuming that the aperture $3a$ and the aperture $4a$ have substantially the same dimensions, the ratio of the possible incident angle $\omega a$ (which is substantially equal to the possible incident angle $\omega$ with respect to the unillustrated concave diffraction grating in the polychromator 7) with respect to the incident end $6a$ at the view angle of 1°, and the possible incident angle $\omega b$ (which is smaller than the possible incident angle $\omega$) with respect to the incident end $6a$ at the view angle of 0.1° is 3.2:1. The incident light amount at the view angle of 0.1° is one-tenth of the incident light amount at the view angle of 1°. As compared with the conventional arrangement, wherein the incident light amount at the view angle of 0.1° is one-hundredth of the incident light amount at the view angle of 1°, the above arrangement enables to increase the incident light amount at the view angle of 0.1° by about ten times (=(1/10)÷(1/100)). In the case where the ratio of possible incident angle is 3.2:1, the f-number (i.e. a value obtained by dividing the focal length of a lens element by an effective aperture) of the objective lens 2 at the view angle of 0.1° is 1/3.2 times as large as the f-number of the objective lens 2 at the view angle of 1°. In other words, unlike the conventional arrangement, the above arrangement enables to increase the incident light amount with respect to a measurement system at a small view angle of 0.1° by enhancing the performance of the objective lens 2 i.e. increasing the f-number by 1/3.2 times. This enables to increase the incident light amount at the view angle of 0.1°.

First Modification

Figure 2:
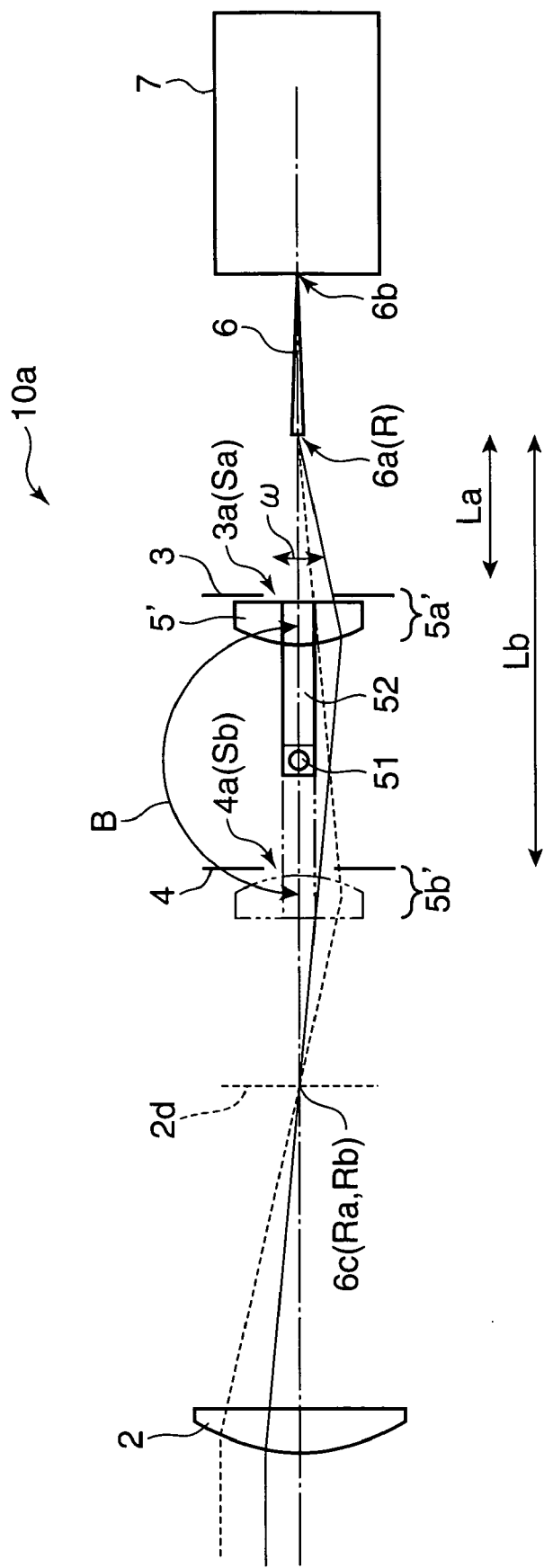
FIG. 2 is a diagram showing a modification of the light receiving optical system shown in FIG. 1.
Figure 6:
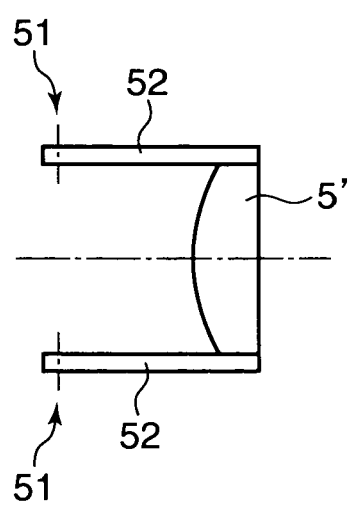
FIG. 6 is a schematic diagram showing an example of a relay optical system, constituted of a relay lens and an arm unit, in the light receiving optical system shown in FIG. 2.
Figure 7:
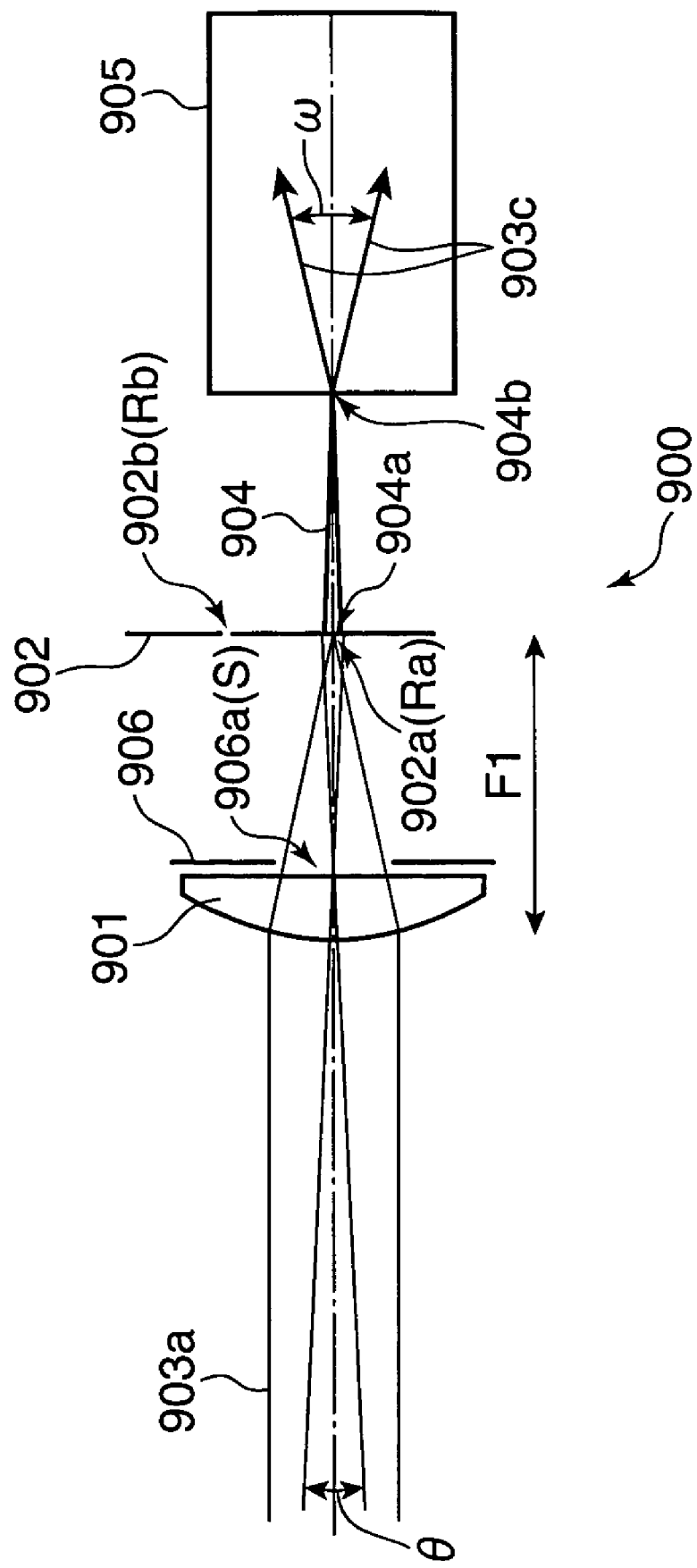
FIG. 7 is a diagram showing a conventional light receiving optical system for view angle switching control.
Figure 8:
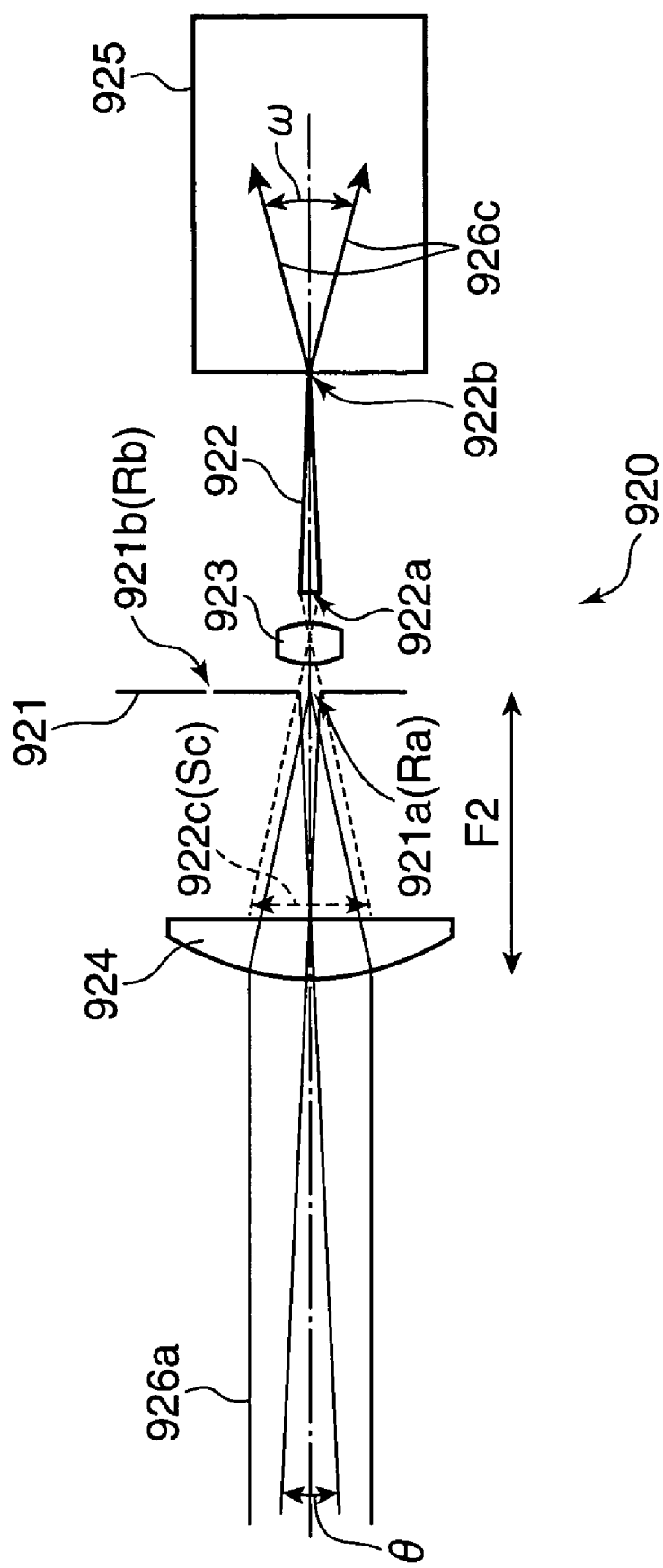
FIG. 8 is a diagram showing another conventional light receiving optical system for view angle switching control.

As described above, the light receiving optical system 10 provided with the relay lens 5 as a relay optical system may be configured into a light receiving optical system $10a$ as shown in FIG. 2. Specifically, the light receiving optical system $10a$ may include: a relay lens 5', as a flat convex lens, having an incident plane and an exit plane of curvatures asymmetrical to each other, e.g. having one plane thereof shaped into a flat plane and the other plane thereof shaped into a convex plane, in place of the relay lens 5 as a biconvex lens; and a mechanism constructed in such a manner that one end of an arm unit 52 is aligned with an axis of a rod 51 about which the arm unit 52 is pivotally rotated, and the other end of the arm unit 52 is attached to the relay lens 5', whereby the relay lens 5' is selectively switched between a first conjugated position 5a' and a second conjugated position 5b' by a manual operation or a predetermined driver. The arm unit 52 is a pair of linear arm members extending in the optical axis direction of the relay lens 5'. For instance, as shown in FIG. 6, the arm members of the arm unit 52 are attached to the relay lens 5' in such a manner that the arm members are juxtaposed in a direction orthogonal to the optical axis of the relay lens 5' in parallel to each other with respect to the optical axis. In other words, a perimeter of the relay lens 5' is held by the other end portions of the respective arm members. In this arrangement, the relay lens 5' is pivotally rotated about the axis of the rod 51 along an arc-shaped trajectory indicated by the arrows B in FIG. 2. Thereby, the relay lens 5' is selectively switched between the first conjugated position 5a' and the second conjugated position 5b' in such a manner that the flat plane and the convex plane of the relay lens 5' are oppose to each other in the optical axis direction, in other words, the incident plane and the exit plane of the relay lens 5' are switched so that the plane of the relay lens 5' facing the incident end 6a is switched between the flat plane and the convex plane.

In the above arrangement, a light flux passing through the relay lens 5' has a substantially identical optical path in the case where the relay lens 5' is selectively switched between the first conjugated position 5a' and the second conjugated position 5b', and an imaging performance which has been optimized at one of the first conjugated position 5a' and the second conjugated position 5b' with respect to the incident end 6a can also be obtained at the other of the first conjugated position 5a' and the second conjugated position 5b'. This enables to secure a performance required at each of the conjugated positions such as an imaging performance at a low cost by the relay lens having the incident plane and the exit plane of respective optimal curvatures, and realize a driver for selectively moving the relay lens 5' between the conjugated positions with a simplified arrangement i.e. the arm unit 52 which is pivotally rotatable about the axis orthogonal to the optical axis. Also, as shown in FIG. 2, the above modification enables to arrange a second aperture stop 4 at such a position that the relay lens 5' does not intervene between the second aperture stop 4 and the incident end 6a of the conversion fiber 6. Specifically, the above arrangement enables to arrange the relay lens 5' closer to an objective lens 2 with respect to the second aperture stop 4, in other words, arrange the relay lens 5' upstream with respect to a first aperture stop 3 and the second aperture stop 4. This enables to eliminate an influence of position error of the relay lens 5' to the incident light amount with respect to the incident end 6a at any of the conjugated positions.

Second Modification

Figure 3:
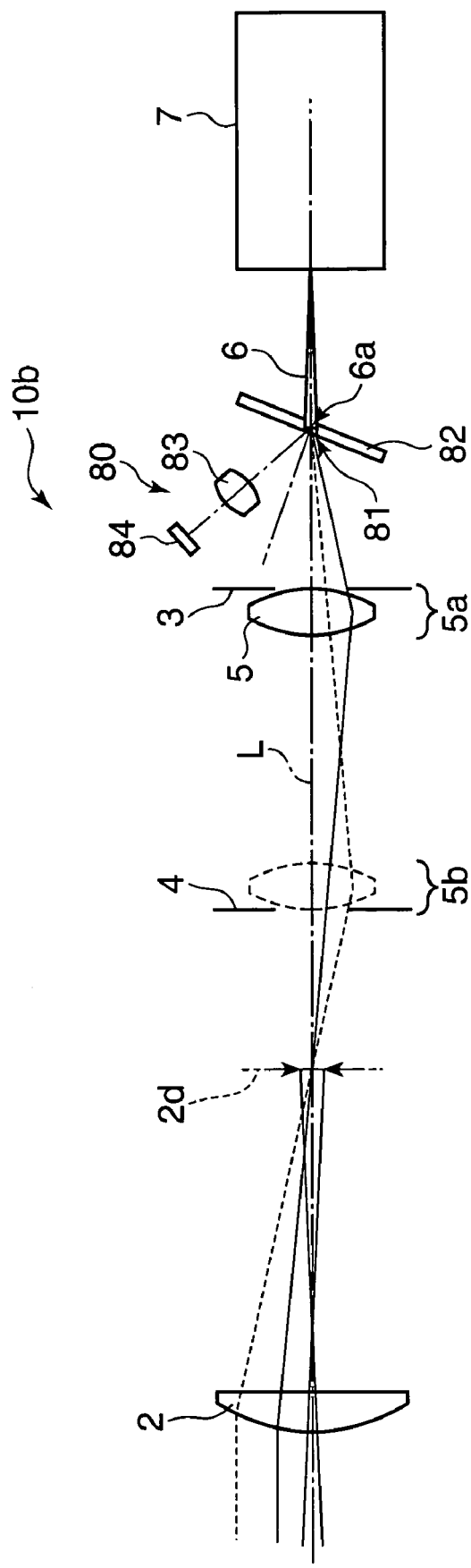
FIG. 3 is a diagram showing an example of a light receiving optical system for view angle switching control to be used in combination with a viewfinder optical system.

As described above, in the light receiving optical system 10 shown in FIG. 1, a light flux from a measurement area as a measurement site is convergently incident onto the incident end 6a of the conversion fiber 6. However, in view of a point that an image in the periphery of the measurement area is formed on a perimeter of the incident end 6a as an incident end surface, the light receiving optical system 10 for view angle switching control in the embodiment may be used in combination with a viewfinder optical system for viewing the measurement area. In the modification, as shown in FIG. 3, for instance, the viewfinder optical system e.g. an electronic viewfinder system may include a flat mirror 82 formed with an opening 81 in the middle thereof, and an image pickup system 80 comprised of an image pickup lens 83 and an image sensor 84. The plane mirror 82 is tiltingly mounted on a conversion fiber 6 at a predetermined angle with respect to the optical axis L of a light receiving optical system 10b by engagement of an incident end 6a of the conversion fiber 6 in the opening 81. The flat mirror 82 is adapted to reflect incident light from the periphery of the measurement area, which has propagated through an objective lens 2 and a relay lens 5, toward the image pickup system 80. The image pickup lens 83 in the image pickup system 80 is adapted to form the image in the periphery of the measurement area on the image sensor 84. An image signal indicating the image in the periphery of the measurement area which has been acquired by the image sensor 84 is subjected to image processing by a predetermined processor (not shown), and the processed signal is displayed on a predetermined display section for viewing. Thereby, a user is allowed to visually recognize the image in the periphery of the measurement area.

The light receiving optical system 10 (10a, 10b) is applied to e.g. a spectrophotometer for measuring a spectral distribution of light to be irradiated from e.g. a specific measurement area. The spectrophotometer includes a signal processor (not shown) and a computation controller (not shown), in addition to the light receiving optical system 10 (10a, 10b). The signal processor is connected to the polychromator 7, and is adapted to perform signal processing of converting an output signal from the sensor array i.e. a pixel output in accordance with a spectral distribution or a channel output into e.g. a digital pixel signal for outputting the digital pixel signal to the computation controller. The computation controller is constituted of an ROM (Read Only Memory), an RAM (Random Access Memory), and a CPU (Central Processing unit), and controls overall operations of the spectrophotometer. In the embodiment and the modifications, particularly, the computation controller performs various computations concerning a spectral characteristic i.e. a spectral distribution of light to be measured, based on a pixel signal from the signal processor.

As described above, the light receiving optical system for view angle switching control in the embodiment/modifications i.e. the light receiving optical system 10, 10a, 10b includes: an objective optical system, i.e. the objective lens 2, for allowing incidence of light to be measured; a view angle defining aperture member, i.e. the conversion fiber 6, having a view angle defining aperture, i.e. the incident end 6a, for defining a view angle; a relay optical system for converging the light to be measured which has been converged on an image plane, i.e. the image plane 2d, of the objective optical system through the view angle defining aperture for incidence through the view angle defining aperture. The light receiving optical system has the relay optical system with a relay lens, i.e. the relay lens 5, 5', operable to be selectively switched between a first conjugated position i.e. the first conjugated position 5a, 5a' and a second conjugated position i.e. the second conjugated position 5b, 5b'; a first light flux limiting aperture member, i.e. the first aperture stop 3, having a first light flux limiting aperture, i.e. the aperture 3a, for limiting a light flux of the light to be measured locating in proximity to the relay lens in the case where the relay lens is shifted to the first conjugated position; and a second light flux limiting aperture member i.e. the second aperture stop 4, having a second light flux limiting aperture, i.e. the aperture 4a, for limiting a light flux of the light to be measured locating in proximity to the relay lens in the case where the relay lens is shifted to the second conjugated position. The relay optical system is operable to selectively form, on the image plane of the objective optical system, an enlarged image, i.e. the incident end image 6c, with respect to the view angle defining aperture in the case where the relay lens is shifted to the first conjugated position, and a reduced image, i.e. the incident end image 6c, with respect to the view angle defining aperture in the case where the relay lens is shifted to the second conjugated position to switch over the view angle, i.e. the view angle θ. The first light flux limiting aperture member and the second light flux limiting aperture member are operable to regulate an incident light flux through the view angle defining aperture by the first light flux limiting aperture and the second light flux limiting aperture, respectively, in the case where the relay lens is selectively switched between the first conjugated position and the second conjugated position.

In the above arrangement, selectively switching the relay lens in the relay optical system between the first conjugated position and the second conjugated position enables to selectively form the enlarged image and the reduced image with respect to the view angle defining aperture, on the image plane of the objective optical system, for switching over the view angle. In the arrangement operable to switch over the view angle, the relay lens at the first conjugated position, and the first light flux limiting aperture member are arranged in proximity to each other; and the relay lens at the second conjugated position, and the second light flux limiting aperture of the second light flux limiting aperture member are arranged in proximity to each other. This enables to suppress error sensitivity of incident light amount with respect to the view angle defining aperture, to a position error of the relay lens i.e. to a location of the conjugated positions, i.e. an influence to the incident light amount resulting from a position error of the relay lens. In other words, the above arrangement enables to realize a light receiving optical system with no or less influence of reproduction error resulting from movement of the optical system. Also, in the arrangement operable to switch over the view angle, the incident light flux through the view angle defining aperture is regulated by the first light flux limiting aperture of the first light flux limiting member and the second light flux limiting aperture of the second light flux limiting member, respectively, in the case where the relay lens is selectively switched between the first conjugated position and the second conjugated position. This enables to realize a light receiving optical system capable of controlling the incident light flux i.e. the incident light amount with respect to the view angle defining aperture by selectively setting the first light flux limiting aperture and the second light flux limiting aperture depending on a switching operation of the view angle.

Preferably, a ratio of view angle to be obtained in the case where the view angle is switched is a ratio of a first view angle to be obtained based on the size of the enlarged image and a focal length of the objective optical system, and a second view angle to be obtained based on the size of the reduced image and the focal length of the objective optical system.

The above arrangement enables to perform a view angle switching operation by selectively switching the relay lens between the first conjugated position and the second conjugated position with a simplified construction.

Preferably, a ratio of light amount of the incident light flux through the view angle defining aperture to be obtained in the case where the view angle is switched is expressed by:

$$Sa/La^2 : Sb/Lb^2$$

where $Sa$ is an aperture area of the first light flux limiting aperture, $Sb$ is an aperture area of the second light flux limiting aperture, $La$ is a distance between the first light flux limiting aperture member and the view angle defining aperture member, $Lb$ is a distance between the second light flux limiting aperture member and the view angle defining aperture member, and the symbol "/" indicates division.

In the above arrangement, selectively switching the relay lens between the first conjugated position and the second conjugated position enables to facilitate control of the light amount of the incident light flux through the view angle defining aperture.

Preferably, the view angle defining aperture member is an optical fiber i.e. the conversion fiber 6, and the view angle defining aperture is an incident end surface i.e. the incident end 6a of the optical fiber.

The above arrangement enables to allow the incident light flux through the view angle defining aperture to be efficiently incident onto a spectral device such as the polychromator 7.

Preferably, the relay optical system is operable to switchingly locate an incident plane and an exit plane of the relay lens at the first conjugated position and the second conjugated position in the case where the relay lens is selectively switched between the first conjugated position and the second conjugated position.

The above arrangement enables to make the imaging performances of the relay lens at the first conjugated position and the second conjugated position substantially equal to each other, provide the relay lens with performances required at the conjugated positions with use of a single lens element, and produce the relay lens having the required performances at a low cost.

Preferably, the relay optical system further includes a pair of arm members, i.e. the arm unit 52, having one ends thereof for holding a perimeter of the relay lens, and the other ends thereof being aligned with an axis of rotation about which the arm members are pivotally rotated, the arm members extending in an optical axis direction of the relay lens in parallel to each other, and the arm members are pivotally rotated in association with the relay lens to switchingly locate the incident plane and the exit plane of the relay lens at the first conjugated position and the second conjugated position.

The above arrangement enables to provide an arrangement operable to switchingly locate the incident plane and the exit plane of the relay lens at the first conjugated position and the second conjugated position with a simplified construction. The above arrangement also enables to provide the relay lens operable to switchingly locate the incident plane and the exit plane thereof at the first conjugated position and the second conjugated position with a single lens element, which is advantageous in reducing the cost.

Preferably, the incident plane and the exit plane of the relay lens have curvatures asymmetrical to each other.

The above arrangement enables to configure the relay lens operable to switchingly locate the incident plane and the exit plane thereof at the first conjugated position and the second conjugated position, into a lens element having an enhanced imaging performance.

A spectrophotometer according to another aspect of the invention is a spectrophotometer including the light receiving optical system having the above arrangement.

In the above arrangement, selectively switching the relay lens in the relay optical system between the first conjugated position and the second conjugated position enables to selectively form the enlarged image and the reduced image with respect to the view angle defining aperture, on the image plane of the objective optical system, for switching over the view angle. In the arrangement operable to switch over the view angle, the relay lens at the first conjugated position, and the first light flux limiting aperture of the first light flux limiting aperture member are arranged in proximity to each other; and the relay lens at the second conjugated position, and the second light flux limiting aperture of the second light flux limiting aperture member are arranged in proximity to each other. This enables to suppress error sensitivity of incident light amount with respect to the view angle defining aperture, to a position error of the relay lens i.e. to a location of the conjugated positions, i.e. an influence to the incident light amount resulting from a position error of the relay lens. In other words, the above arrangement enables to realize a spectrophotometer incorporated with a light receiving optical system with no or less influence of reproduction error resulting from movement of the optical system. Also, in the arrangement operable to switch over the view angle, the incident light flux through the view angle defining aperture is regulated by the first light flux limiting aperture of the first light flux limiting member and the second light flux limiting aperture of the second light flux limiting member, respectively, in the case where the relay lens is selectively switched between the first conjugated position and the second conjugated position. This enables to realize a spectrophotometer incorporated with a light receiving optical system capable of controlling the incident light flux i.e. the incident light amount with respect to the view angle defining aperture by selectively setting the first light flux limiting aperture and the second light flux limiting aperture depending on a switching operation of the view angle.

The specification discloses the aforementioned arrangements. The following is a summary of the primary arrangements of the embodiments.

A light receiving optical system according to an aspect of the invention comprises: an objective optical system for allowing incidence of light to be measured; a view angle defining aperture member having a view angle defining aperture for defining a view angle; a relay optical system for converging the light to be measured which has been converged on an image plane of the objective optical system on the view angle defining aperture for incidence through the view angle defining aperture, the relay optical system having a relay lens operable to be selectively switched between a first conjugated position and a second conjugated position; a first light flux limiting aperture member having a first light flux limiting aperture for limiting a light flux of the light to be measured locating in proximity to the relay lens in the case where the relay lens is shifted to the first conjugated position; and a second light flux limiting aperture member having a second light flux limiting aperture for limiting a light flux of the light to be measured locating in proximity to the relay lens in the case where the relay lens is shifted to the second conjugated position, wherein the relay optical system is operable to selectively form, on the image plane of the objective optical system, an enlarged image of the view angle defining aperture in the case where the relay lens is shifted to the first conjugated position, and a reduced image of the view angle defining aperture in the case where the relay lens is shifted to the second conjugated position to switch over the view angle, and the first light flux limiting aperture member and the second light flux limiting aperture member are operable to limit an incident light flux through the view angle defining aperture by the first light flux limiting aperture and the second light flux limiting aperture, respectively, in the case where the relay lens is selectively switched between the first conjugated position and the second conjugated position.

In the above arrangement, selectively switching the relay lens in the relay optical system between the first conjugated position and the second conjugated position enables to selectively form the enlarged image and the reduced image of the view angle defining aperture, on the image plane of the objective optical system, for switching over the view angle. In the arrangement operable to switch over the view angle, the relay lens at the first conjugated position, and the first light flux limiting aperture of the first light flux limiting aperture member are arranged in proximity to each other; and the relay lens at the second conjugated position, and the second light flux limiting aperture of the second light flux limiting aperture member are arranged in proximity to each other. This enables to suppress error sensitivity of incident light amount with respect to the view angle defining aperture, to a position error of the relay lens i.e. to a location of the conjugated positions, i.e. an influence to the incident light amount resulting from a position error of the relay lens. In other words, the above arrangement enables to realize a light receiving optical system with no or less influence of reproduction error resulting from movement of the optical system. Also, in the arrangement operable to switch over the view angle, the incident light flux through the view angle defining aperture is limited by the first light flux limiting aperture of the first light flux limiting member and the second light flux limiting aperture of the second light flux limiting member, respectively, in the case where the relay lens is selectively switched between the first conjugated position and the second conjugated position. This enables to realize a light receiving optical system capable of controlling the incident light flux i.e. the incident light amount with respect to the view angle defining aperture by selectively setting the first light flux limiting aperture and the second light flux limiting aperture depending on a switching operation of the view angle.

In the light receiving optical system, preferably, a ratio of view angle to be obtained in the case where the view angle is switched may be a ratio of a first view angle to be obtained based on the size of the enlarged image and a focal length of the objective optical system, and a second view angle to be obtained based on the size of the reduced image and the focal length of the objective optical system.

The above arrangement enables to perform a view angle switching operation by selectively switching the relay lens between the first conjugated position and the second conjugated position with a simplified construction.

In the light receiving optical system, preferably, a ratio of light amount of the incident light flux through the view angle defining aperture to be obtained in the case where the view angle is switched may be expressed by:

$$Sa/La^2 : Sb/Lb^2$$

where Sa is an aperture area of the first light flux limiting aperture,

Sb is an aperture area of the second light flux limiting aperture,

La is a distance between the first light flux limiting aperture member and the view angle defining aperture, Lb is a distance between the second light flux limiting aperture member and the view angle defining aperture, and the symbol "/" indicates division.

In the above arrangement, selectively switching the relay lens between the first conjugated position and the second conjugated position enables to facilitate control of the light amount of incident light flux through the view angle defining aperture.

In the light receiving optical system, preferably, the view angle defining aperture member may be an optical fiber, and the view angle defining aperture may be an incident end of the optical fiber.

The above arrangement enables to allow the incident light flux through the view angle defining aperture to be efficiently incident onto a spectral device such as a polychromator.

In the light receiving optical system, preferably, the relay optical system may be operable to invert an incident side and an exit side of the relay lens at the first conjugated position and the second conjugated position while the relay lens is selectively switched between the first conjugated position and the second conjugated position.

The above arrangement enables to make the imaging performances of the relay lens at the first conjugated position and the second conjugated position substantially equal to each other, provide the relay lens with performances required at the conjugated positions with use of a single lens element, and produce the relay lens having the required performances at a low cost.

In the light receiving optical system, preferably, the relay optical system may further include an arm member having one end thereof for holding a perimeter of the relay lens, and the other end fixed to an axis of rotation about which the arm member is pivotally rotated, the arm member extending in parallel to an optical axis of the relay lens, and the arm member may be pivotally rotated in association with the relay lens to invert the incident side and the exit side of the relay lens while the relay lens is selectively switched between the first conjugated position and the second conjugated position.

The above arrangement enables to provide an arrangement operable to switchingly locate the incident plane and the exit plane of the relay lens at the first conjugated position and the second conjugated position with a simplified construction. The above arrangement also enables to provide the relay lens operable to invert the incident side and the exit side thereof while the relay lens is selectively switched between the first conjugated position and the second conjugated position with a single lens element, which is advantageous in reducing the cost.

In the light receiving optical system, preferably, the incident side and the exit side of the relay lens may be asymmetrical to each other.

The above arrangement enables to configure the relay lens operable to invert the incident side and the exit side thereof while the relay lens is selectively switched between the first conjugated position and the second conjugated position, into a lens element having an enhanced imaging performance.

A spectrophotometer according to another aspect of the invention comprises the light receiving optical system having the above arrangement.

In the above arrangement, selectively switching the relay lens in the relay optical system between the first conjugated position and the second conjugated position enables to selectively form the enlarged image and the reduced image of the view angle defining aperture, on the image plane of the objective optical system, for switching over the view angle. In the arrangement operable to switch over the view angle, the relay lens at the first conjugated position, and the first light flux limiting aperture of the first light flux limiting aperture member are arranged in proximity to each other; and the relay lens at the second conjugated position, and the second light flux limiting aperture of the second light flux limiting aperture member are arranged in proximity to each other. This enables to suppress error sensitivity of incident light amount with respect to the view angle defining aperture, to a position error of the relay lens i.e. to a location of the conjugated positions, i.e. an influence to the incident light amount resulting from a position error of the relay lens. In other words, the above arrangement enables to realize a spectrophotometer incorporated with a light receiving optical system with no or less influence of reproduction error resulting from movement of the optical system. Also, in the arrangement operable to switch over the view angle, the incident light flux through the view angle defining aperture is regulated by the first light flux limiting aperture of the first light flux limiting member and the second light flux limiting aperture of the second light flux limiting member, respectively, in the case where the relay lens is selectively switched between the first conjugated position and the second conjugated position. This enables to realize a spectrophotometer incorporated with a light receiving optical system capable of controlling the incident light flux i.e. the incident light amount with respect to the view angle defining aperture by selectively setting the first light flux limiting aperture and the second light flux limiting aperture depending on a switching operation of the view angle.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A light receiving optical system for view angle switching control, comprising:
    an objective optical system for allowing incidence of light to be measured;
    a view angle defining aperture member having a view angle defining aperture for defining a view angle;
    a relay optical system for converging the light to be measured which has been converged on an image plane of the objective optical system on the view angle defining aperture for incidence through the view angle defining aperture, the relay optical system having a relay lens operable to be selectively switched between a first conjugate position and a second conjugate position;
    a first light flux limiting aperture member having a first light flux limiting aperture for limiting a light flux of the light to be measured located in proximity to the relay lens in the case where the relay lens is shifted to the first conjugate position; and
    a second light flux limiting aperture member having a second light flux limiting aperture for limiting a light flux of the light to be measured located in proximity to the relay lens in the case where the relay lens is shifted to the second conjugate position, wherein the relay optical system is operable to selectively form, on the image plane of the objective optical system, an enlarged image of the view angle defining aperture in the case where the relay lens is shifted to the first conjugate position, and a reduced image of the view angle defining aperture in the case where the relay lens is shifted to the second conjugate position to switch over the view angle, and the first light flux limiting aperture member and the second light flux limiting aperture member are operable to limit an incident light flux through the view angle defining aperture by the first light flux limiting aperture and the second light flux limiting aperture, respectively, in the case where the relay lens is selectively switched between the first conjugate position and the second conjugate position.

2. The light receiving optical system according to claim 1, wherein the view angle defining aperture member is an optical fiber, and the view angle defining aperture is an incident end of the optical fiber.

3. The light receiving optical system according to claim 1, wherein the relay optical system is operable to invert an incident side and an exit side of the relay lens at the first conjugate position and the second conjugate position while the relay lens is selectively switched between the first conjugate position and the second conjugate position.

4. The light receiving optical system according to claim 3, wherein the relay optical system further includes an arm member having one end thereof for holding the relay lens, and the other end thereof being fixed to an axis of rotation about which the arm member is pivotally rotated, the arm member extending in parallel to an optical axis of the relay lens, and the arm member is pivotally rotated in association with the relay lens to invert the incident side and the exit side of the relay lens while the relay lens is selectively switched between the first conjugate position and the second conjugate position.

5. The light receiving optical system according to claim 3, wherein the incident side and the exit side of the relay lens is asymmetrical to each other.

6. A spectrophotometer, comprising:
   a light receiving optical system for view angle switching control, including:
   an objective optical system for allowing incidence of light to be measured;
   a view angle defining aperture member having a view angle defining aperture for defining a view angle;
   a relay optical system for converging the light to be measured which has been converged on an image plane of the objective optical system on the view angle defining aperture for incidence through the view angle defining aperture, the relay optical system having a relay lens operable to be selectively switched between a first conjugate position and a second conjugate position;
   a first light flux limiting aperture member having a first light flux limiting aperture for limiting a light flux of the light to be measured located in proximity to the relay lens in the case where the relay lens is shifted to the first conjugate position; and
   a second light flux limiting aperture member having a second light flux limiting aperture for limiting a light flux of the light to be measured located in proximity to the relay lens in the case where the relay lens is shifted to the second conjugate position, wherein the relay optical system is operable to selectively form, on the image plane of the objective optical system, an enlarged image of the view angle defining aperture in the case where the relay lens is shifted to the first conjugate position, and a reduced image of the view angle defining aperture in the case where the relay lens is shifted to the second conjugate position to switch over the view angle, and
   the first light flux limiting aperture member and the second light flux limiting aperture member are operable to limit an incident light flux through the view angle defining aperture by the first light flux limiting aperture and the second light flux limiting aperture, respectively, in the case where the relay lens is selectively switched between the first conjugate position and the second conjugate position.

* * * * *